United States Patent
Eguchi

(10) Patent No.: US 11,031,810 B2
(45) Date of Patent: Jun. 8, 2021

(54) POWER SUPPLY CIRCUIT AND ELECTRONIC DEVICE

(71) Applicant: FUJITSU LIMITED, Kawasaki (JP)

(72) Inventor: Susumu Eguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/775,305

(22) Filed: Jan. 29, 2020

(65) Prior Publication Data
US 2020/0295596 A1   Sep. 17, 2020

(30) Foreign Application Priority Data
Mar. 12, 2019 (JP) .............................. JP2019-044913

(51) Int. Cl.
*H02J 9/06* (2006.01)

(52) U.S. Cl.
CPC .............. *H02J 9/068* (2020.01); *H02J 9/061* (2013.01)

(58) Field of Classification Search
CPC ...... H02J 9/00; H02J 9/005; H02J 9/04; H02J 9/06; H02J 9/061; H02J 9/068
USPC .......................................................... 307/64
See application file for complete search history.

(56) References Cited

U.S. PATENT DOCUMENTS

| | | | | |
|---|---|---|---|---|
| 5,487,956 A * | 1/1996 | Bromley | ................. | H02J 9/061 320/163 |
| 9,899,834 B1 * | 2/2018 | Mayo | ..................... | G11C 5/143 |
| 2006/0072268 A1 * | 4/2006 | Kang | ...................... | H02J 9/005 361/92 |
| 2013/0246815 A1 * | 9/2013 | Uehara | ..................... | H02J 1/04 713/300 |
| 2014/0183959 A1 * | 7/2014 | Kabasawa | ............... | H02J 9/061 307/66 |
| 2015/0069842 A1 * | 3/2015 | Niu | ......................... | H02J 9/061 307/64 |
| 2016/0065001 A1 * | 3/2016 | Yasukawa | ................ | H02J 1/10 307/64 |
| 2017/0163088 A1 * | 6/2017 | Toyoda | ................. | H02J 7/0068 |
| 2017/0366043 A1 * | 12/2017 | Tu | ........................ | H02J 7/0068 |
| 2018/0143263 A1 * | 5/2018 | Humphrey | ............... | H02J 3/24 |
| 2020/0313457 A1 * | 10/2020 | Kozuki | ................. | H02J 7/1423 |

FOREIGN PATENT DOCUMENTS

JP     2000-207035     7/2000

* cited by examiner

*Primary Examiner* — Levi Gannon
(74) *Attorney, Agent, or Firm* — Fujitsu Patent Center

(57) ABSTRACT

A power supply circuit includes: a standby power supply; a first path coupled to the standby power supply; a main power supply configured to output power a voltage of which is higher than a voltage of power output by the standby power supply; a second path coupled to the main power supply; a switch disposed between the first path and the second path; and a power supply control circuit configured to, upon detection of output of the power from the main power supply, turn on the switch to switch a power supply that supplies power to the first path from the standby power supply to the main power supply, wherein the power supply control circuit is operated by the power supplied through the first path.

14 Claims, 10 Drawing Sheets

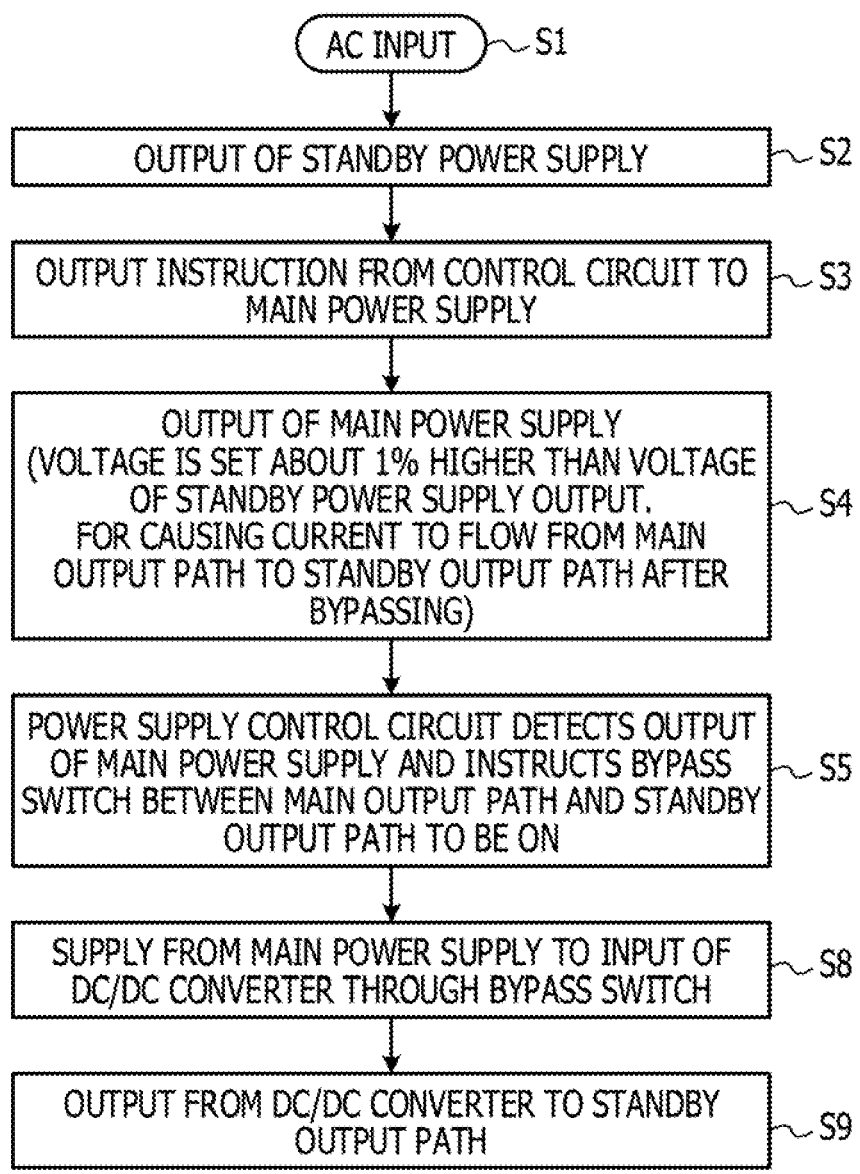

POWER SUPPLY CIRCUIT AND ELECTRONIC DEVICE

CROSS-REFERENCE TO RELATED APPLICATION

This application is based upon and claims the benefit of priority of the prior Japanese Patent Application No. 2019-44913, filed on Mar. 12, 2019, the entire contents of which are incorporated herein by reference.

FIELD

The embodiment discussed herein is related to a power supply circuit and an electronic device.

BACKGROUND

There has been a known power supply device that includes a main power supply, a standby power supply, and a transistor. The standby power supply stops output when an output voltage becomes a predetermined value or larger. The transistor uncouples output sections of both the power supplies from each other during standby time and applies a voltage equal to or larger than the predetermined value from the main power supply to the output section of the standby power supply during non-standby time. With such a configuration, the standby power supply stops the output during the non-standby time. Thus, power loss in the standby power supply may be reduced during the non-standby time.

Related art is disclosed in Japanese Laid-open Patent Publication No. 2000-207035

SUMMARY

According to an aspect of the embodiments, a power supply circuit includes: a standby power supply; a first path coupled to the standby power supply; a main power supply configured to output power a voltage of which is higher than a voltage of power output by the standby power supply; a second path coupled to the main power supply; a switch disposed between the first path and the second path; and a power supply control circuit configured to, upon detection of output of the power from the main power supply, turn on the switch to switch a power supply that supplies power to the first path from the standby power supply to the main power supply, wherein the power supply control circuit is operated by the power supplied through the first path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a flowchart of an example of an operation of an electronic device according to the third example.

DESCRIPTION OF EMBODIMENTS

However, with the related art, a circuit that controls a switch disposed between the output paths of both the power supplies (for example, the transistor in the case of Japanese Laid-open Patent Publication No. 2000-207035) is the main power supply. Thus, a power source for this circuit is not secured in while the main power supply is stopped.

Accordingly, a power supply circuit and an electronic device able to secure a power source for a circuit that controls a switch disposed between output paths of a standby power supply and a main power supply while the main power supply is stopped may be provided.

Hereinafter, an embodiment of the present disclosure will be described with reference to the drawings.

Figure 1:
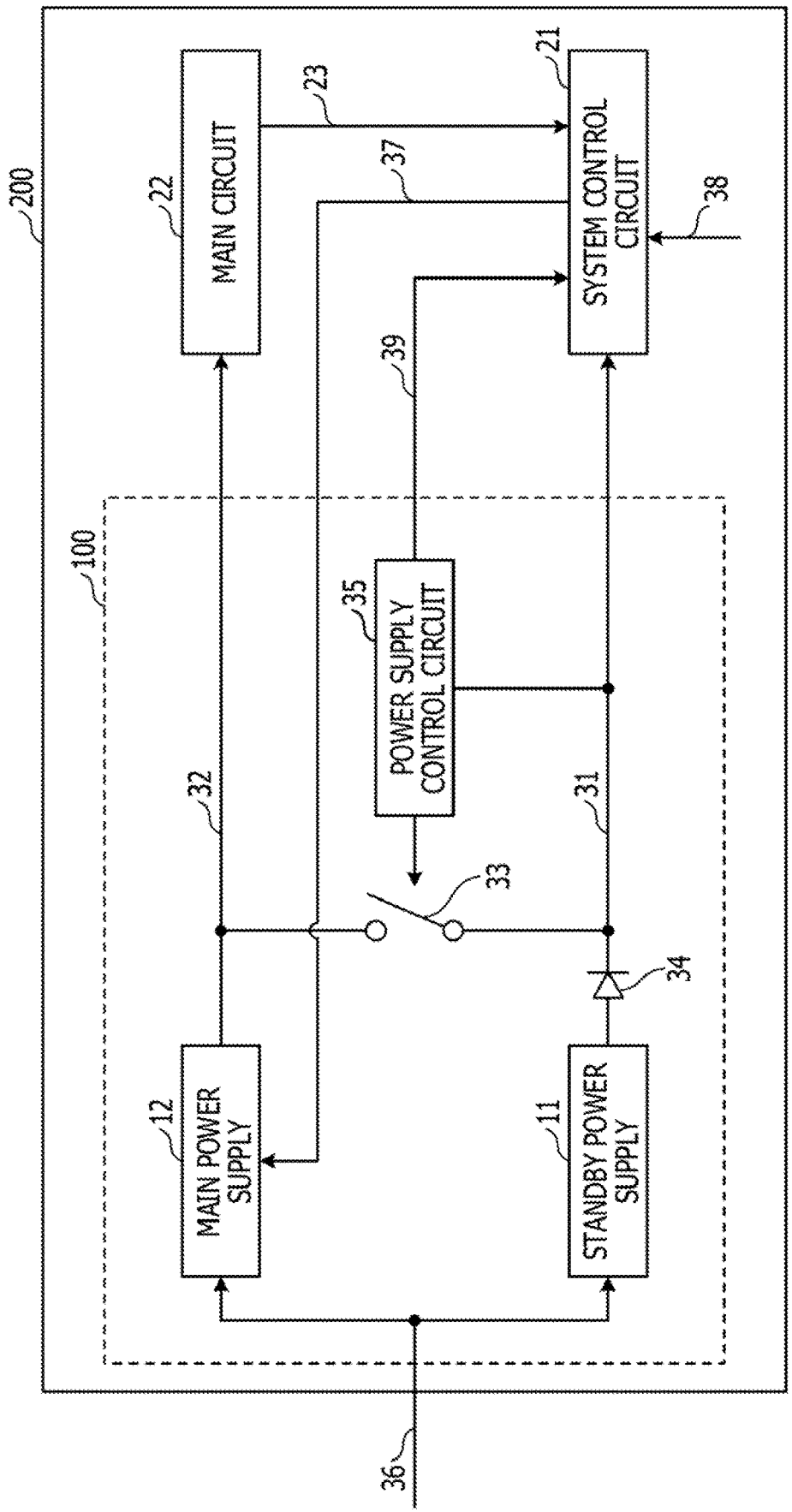
FIG. 1 illustrates an example of a configuration of an electronic device according to an embodiment.

FIG. 1 illustrates an example of a configuration of an electronic device according to an embodiment. An electronic device 200 illustrated in FIG. 1 includes a power supply circuit 100 that generates direct current power. The electronic device 200 is operated by the direct current power generated by the power supply circuit 100. The power supply circuit 100 may be disposed inside or outside the electronic device 200. Although examples of the electronic device 200 include a server, a personal computer, a mobile terminal device, and so forth, the electronic device 200 according to the present embodiment is not limited to any of these.

The electronic device 200 includes, other than the power supply circuit 100, a system control circuit 21 and a main circuit 22. The system control circuit 21 and the main circuit 22 are operated by the direct current power supplied from the power supply circuit 100. The system control circuit 21 is required to operate not only during standby time during which the main circuit 22 is not required to operate but also during non-standby time during which the main circuit 22 is required to operate. The system control circuit 21 monitors a state of the power supply circuit 100 and the main circuit 22 and controls the power supply circuit 100 and the main circuit 22. For example, the system control circuit 21 monitors the state (voltage, current, temperature, alarm signals, or the like) of the power supply circuit 100 and other units mounted in the electronic device 200 and a board on which the main circuit 22 is mounted. When an abnormality occurs due to a failure or the like, the system control circuit 21 determines an abnormality by detecting an alarm signal from a unit or the board or monitoring the voltage, current, temperature, alarm signals, and the like, and the system control circuit 21 performs turn-off processing. The system control circuit 21 performs a turn-on sequence or a turn-off sequence when turning on or turning off the electronic device 200. The system control circuit 21 is operated when electric power is supplied from a standby power supply 11. The main circuit 22 includes a memory, a central processing unit (CPU), and so forth. Since the main circuit 22 is not required to operate during the standby time, an operation of a main power supply 12 is stopped and the output of the main power supply 12 is stopped. Thus, the power of the power supply circuit 100 and the electronic device 200 may be saved compared to the case where the main power supply 12 is operated also during the standby time.

The power supply circuit 100 includes the standby power supply 11, a first path 31, the main power supply 12, a second path 32, a switch 33, a power supply control circuit 35, and a diode 34.

Both the standby power supply 11 and the main power supply 12 are coupled to an external power supply 36, and the power supplied from the external power supply 36 is inputted. Although the external power supply 36 is an alternating current power supply that outputs an alternating current (for example, a commercial alternating current power supply), the external power supply may be a direct current power supply that outputs a direct current.

The standby power supply 11 converts the power supplied from the external power supply 36 into direct current power and supplies the converted direct current power to the system control circuit 21 through the first path 31. The system control circuit 21 is operated by the power supplied through the first path 31. The first path 31 is coupled to an output section of the standby power supply 11 and is coupled to a power input section of the system control circuit 21. The standby power supply 11 operates such that the voltage of the direct current power output to the first path 31 is a first set voltage.

The main power supply 12 converts the power supplied from the external power supply 36 into direct current power and supplies the converted direct current power to the main circuit 22 through the second path 32. The main circuit 22 is operated by the power supplied through the second path 32. The second path 32 is coupled to an output section of the main power supply 12 and is coupled to a power input section of the main circuit 22. The main power supply 12 operates such that the voltage of the direct current power output to the second path 32 is a second set voltage higher than the first set voltage. This allows the main power supply 12 to output power of a higher voltage than that of the standby power supply 11.

Based on an output instruction from the outside, the main power supply 12 starts to output the power of a higher voltage than that of the standby power supply 11 to the second path 32. Based on a stop instruction from the outside, the main power supply 12 stops the outputting of the power to the second path 32. An instruction signal 37 indicative the output instruction or the stop instruction for the main power supply 12 is output from the system control circuit 21 to the main power supply 12. The system control circuit 21 outputs the instruction signal 37 indicative of the output instruction or the stop instruction for the main power supply 12 in accordance with the presence/absence of a release command 38 for a standby state. Normally, the release command 38 is transmitted from a control terminal (not illustrated) in accordance with a determination of an administrator. When an abnormality occurs in the electronic device 200 other than the power supply circuit 100, the system control circuit 21 itself detects the abnormality and outputs the instruction signal 37 indicative of the stop instruction for the main power supply 12.

The switch 33 is an element disposed between the first path 31 and the second path 32. The switch 33 is a bypass switch that couples or uncouples the first path 31 and the second path 32 to or from each other in accordance with a switching signal supplied from the power supply control circuit 35. For example, the switch 33 is transistor or another switching element or a relay. From the viewpoint of suppressing losses in the switch 33, the switch 33 is preferably a field-effect transistor (FET) having a comparatively small ON resistance.

The power supply control circuit 35 is operated by the power supplied through the first path 31. When the switch 33 is turned from off to on, the power supply control circuit 35 switches the power supply that supplies the power to the first path 31 from the standby power supply 11 to the main power supply 12. When the switch 33 is in an off state, the power is supplied from the standby power supply 11 to the first path 31. When the switch 33 is in an on state, the power the voltage of which is higher than that of the standby power supply 11 is supplied from the main power supply 12 to the first path 31 through the switch 33. Thus, the power supply from the standby power supply 11 to the first path 31 is stopped.

The diode 34 is a backflow blocking element that blocks a current flowing from the second path 32 to the standby power supply 11 through the switch 33. Insertion of the diode 34 in series with the first path 31 blocks supply of the power output from the main power supply 12 (for example, the power the voltage of which is higher than that of the standby power supply 11) to the standby power supply 11 through the second path 32 and the switch 33. The diode 34 is coupled such that the anode side of the diode 34 is coupled to the standby power supply 11 and the cathode side of the diode 34 is coupled to a side where the switch 33 is coupled.

According to the form illustrated in FIG. 1, when the switch 33 is turned on during the non-standby time during which the operation of the main circuit 22 is required, the power supply from the standby power supply 11 to the first path 31 is stopped, thereby loss in the standby power supply 11 during the non-standby time is reduced. As a result, the power may be saved during the non-standby time of the power supply circuit 100 and the electronic device 200. The standby power supply 11 means a standby power supply that supplies the power to the system control circuit 21.

Since the power supply control circuit 35 is operated by the power supplied through the first path 31, the power source of the power supply control circuit 35 is able to be secured even while the main power supply 12 is stopped (for example, during the standby time). Accordingly, even while the main power supply 12 is stopped, the power supply control circuit 35 is able to output an on signal for switching the switch 33 from off to on or an off signal for switching the switch 33 from on to off.

The power supply control circuit 35 monitors the state of the power supply circuit 100 (for example, at least one of the standby power supply 11, the first path 31, the main power supply 12, or the second path 32) while the power is supplied through the first path 31. Thus, even while the main power supply 12 is stopped, the state of the power supply circuit 100 (for example, at least one of the voltage, current, or temperature) is able to be monitored. As a result, the power supply control circuit 35 is able to output a monitoring result to the outside (for example, the system control circuit 21) while the main power supply 12 is stopped, and the system control circuit 21 is able to obtain the state of the power supply circuit 100 while the main power supply 12 is stopped and use the obtained state for predetermined control.

When an abnormality of the power supply circuit 100 is detected while the power is supplied through the first path 31, the power supply control circuit 35 turns off the switch 33. Thus, a problem caused by a situation in which abnormality of the power supply circuit 100 occurs when the switch 33 is in the on state may be avoided. When an abnormality of the power supply circuit 100 is detected while the power is supplied through the first path 31, the power supply control circuit 35 outputs an alarm signal 39 to the system control circuit 21. Thus, even while the main power supply 12 is stopped, the system control circuit 21 may detect an abnormality occurring in the power supply circuit 100. Examples of the abnormality of the power supply circuit 100 include a voltage abnormality, a current abnormality, a temperature abnormality, and so forth.

When an abnormality of the first path 31 or the standby power supply 11 (for example, overvoltage or overcurrent) is detected while the power is supplied through the first path 31, the power supply control circuit 35 turns off the switch 33. This may suppress application of overvoltage generated in the first path 31 or the standby power supply 11 to the main power supply 12, the second path 32, or the main circuit 22 through the switch 33. This may also suppress flowing of overcurrent generated in the first path 31 or the standby power supply 11 to the main power supply 12, the second path 32, or the main circuit 22 through the switch 33.

When an abnormality of the second path 32 or the main power supply 12 (for example, overvoltage or overcurrent) is detected while the power is supplied through the first path 31, the power supply control circuit 35 turns off the switch 33. This may suppress application of overvoltage generated in the second path 32 or the main power supply 12 to the standby power supply 11, the first path 31, or the system control circuit 21 through the switch 33. This may also suppress flowing of overcurrent generated in the second path 32 or the main power supply 12 to the first path 31 or the system control circuit 21 through the switch 33.

Figure 2:
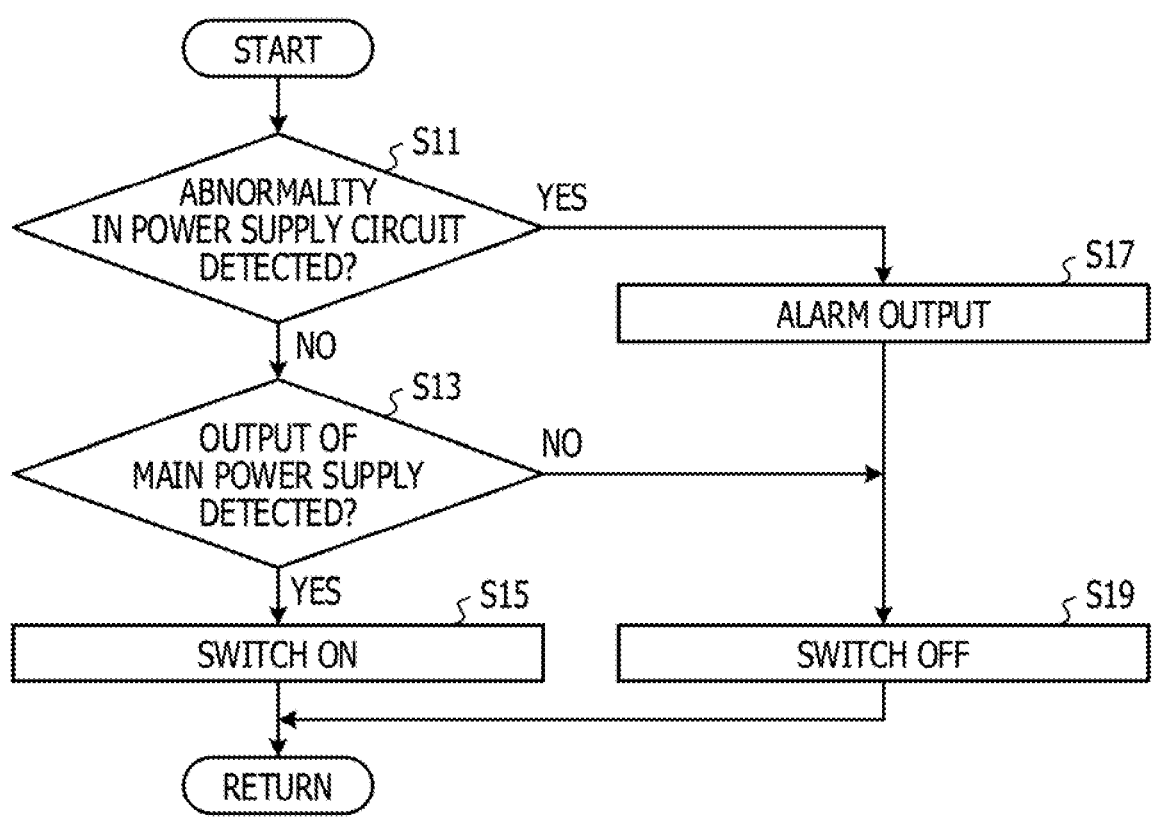
FIG. 2 is a flowchart of an example of operation of a power supply control circuit.

FIG. 2 is a flowchart of an example of an operation of the power supply control circuit 35. The power supply control circuit 35 repeatedly performs processing from the start to return illustrated in FIG. 2 while the power is supplied through the first path 31.

In step S11, the power supply control circuit 35 monitors the state of the power supply circuit 100, thereby determining whether an abnormality occurs in the power supply circuit 100.

When an abnormality of the power supply circuit 100 is detected, the power supply control circuit 35 outputs to the system control circuit 21 the alarm signal 39 notifying of an abnormal state of the power supply circuit 100 (step S17). The power supply control circuit 35 may skip step S17 to perform the operation in step S19.

When an abnormality of the power supply circuit 100 is not detected, the power supply control circuit 35 determines whether the output of the main power supply 12 is detected (step S13).

When the output of the main power supply 12 is detected, the power supply control circuit 35 turns the switch 33 on (step S15). The term "turns the switch 33 on" means that the switch 33 is turned from off to on or the switch 33 is maintained in the on state. Thus, the power output from the main power supply 12 is not only supplied to the main circuit 22 through the second path 32 but also supplied from the second path 32 to the first path 31 through the switch 33. The power supplied to the first path 31 is supplied to the power supply control circuit 35 and the system control circuit 21.

In contrast, when the output of the main power supply 12 is not detected, the power supply control circuit 35 turns the switch 33 off (step S19). The term "turns the switch 33 off" means that the switch 33 is turned from on to off or the switch 33 is maintained in the off state. This may suppress, while the output of the main power supply 12 is stopped by stopping of the operation of the main power supply 12, supply of the power output from the standby power supply 11 from the first path 31 to the second path 32 through the switch 33. This may also suppress an overload applied to the standby power supply 11 (a load applied due to supplying the power from the first path 31 to the second path 32 through the switch 33).

Figure 3:
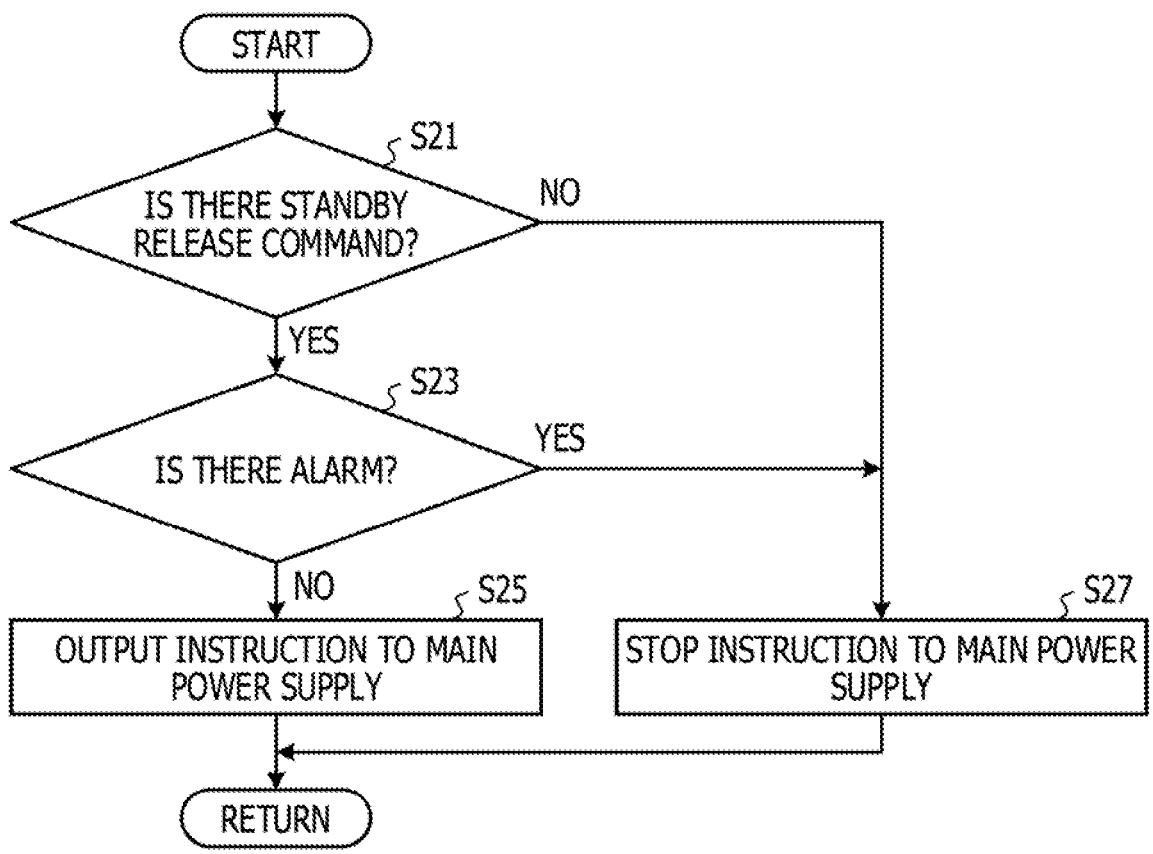
FIG. 3 is a flowchart of an example of operation of a system control circuit.

FIG. 3 is a flowchart of an example of the operation of the system control circuit 21. The system control circuit 21 repeatedly performs processing from the start to return illustrated in FIG. 3 while the power is supplied through the first path 31.

In step S21, the system control circuit 21 determines whether there is the release command 38 for the standby state.

When it is determined that there is no release command 38, the system control circuit 21 outputs the instruction signal 37 indicative of the stop instruction for the main power supply 12 (step S27). Upon reception of the instruction signal 37 indicative of the stop instruction, the main power supply 12 stops output of the power to the second path 32. In contrast, when the system control circuit 21 determines that there is the release command 38, the system control circuit 21 determines whether there is at least one of the alarm signal 39 from the power supply control circuit 35 or an alarm signal 23 from the main circuit 22 (step S23). The alarm signal 23 from the main circuit 22 indicates an abnormality detected on the main circuit 22 side.

When at least one of the alarm signals is detected, the system control circuit 21 outputs the instruction signal 37 indicative of the stop instruction for the main power supply 12 (step S27). In contrast, when neither of the alarm signals is detected, the system control circuit 21 outputs the instruction signal 37 indicative of the output instruction for the main power supply 12 (step S25). Upon reception of the instruction signal 37 indicative of the output instruction, the main power supply 12 starts output of the power to the second path 32.

Figure 4:
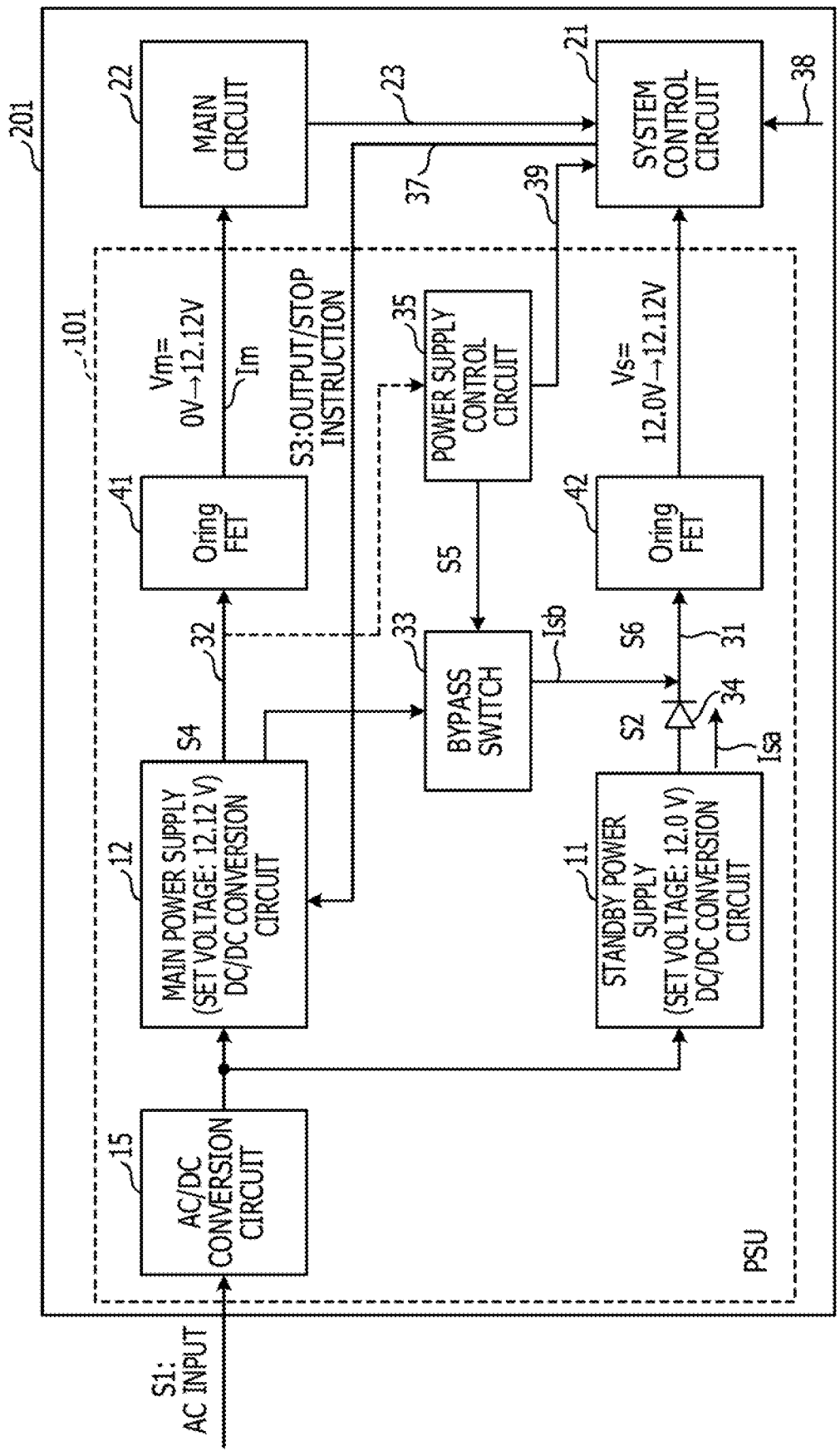
FIG. 4 illustrates an example of a configuration of an electronic device according to a first example.

FIG. 4 illustrates an example of a configuration of an electronic device according to a first example. In FIG. 4, an electronic device 201 is an example of the above-described electronic device 200. A power supply unit (PSU) 101 is an example of the above-described power supply circuit 100. Description of configurations and effects similar to those of the electronic device and the power supply circuit described above are omitted or simplified by incorporating the foregoing description.

The PSU 101 includes an AC/DC conversion circuit 15, the standby power supply 11, the first path 31, the main power supply 12, the second path 32, the switch 33, the power supply control circuit 35, the diode 34, and ORing FETs 41, 42. AC and DC are respectively abbreviations of "alternating current" and "direct current".

The AC/DC conversion circuit 15 is a rectifier circuit that converts AC power supplied from an external power supply into DC power. The standby power supply 11 converts the DC power supplied from the AC/DC conversion circuit 15 into DC power of the first set voltage (for example, 12.0 volts). The main power supply 12 converts the DC power supplied from the AC/DC conversion circuit 15 into DC power of the second set voltage (for example, 12.12 volts).

The ORing FET 41 is inserted in series with the second path 32. The electronic device 201 may include at least one other power supply circuit (not illustrated) coupled to a position between the ORing FET 41 and the main circuit 22 in the second path 32. The ORing FET 41 suppresses unintentional flowing of current from the other power supply circuit (not illustrated) into the main power supply 12. Likewise, the ORing FET 42 is inserted in series with the first path 31. The electronic device 201 may include at least one other power supply circuit (not illustrated) coupled to a position between the ORing FET 42 and the system control circuit 21 in the first path 31. The ORing FET 42 suppresses unintentional flowing of current from the other power supply circuit (not illustrated) into the switch 33.

Figure 5:
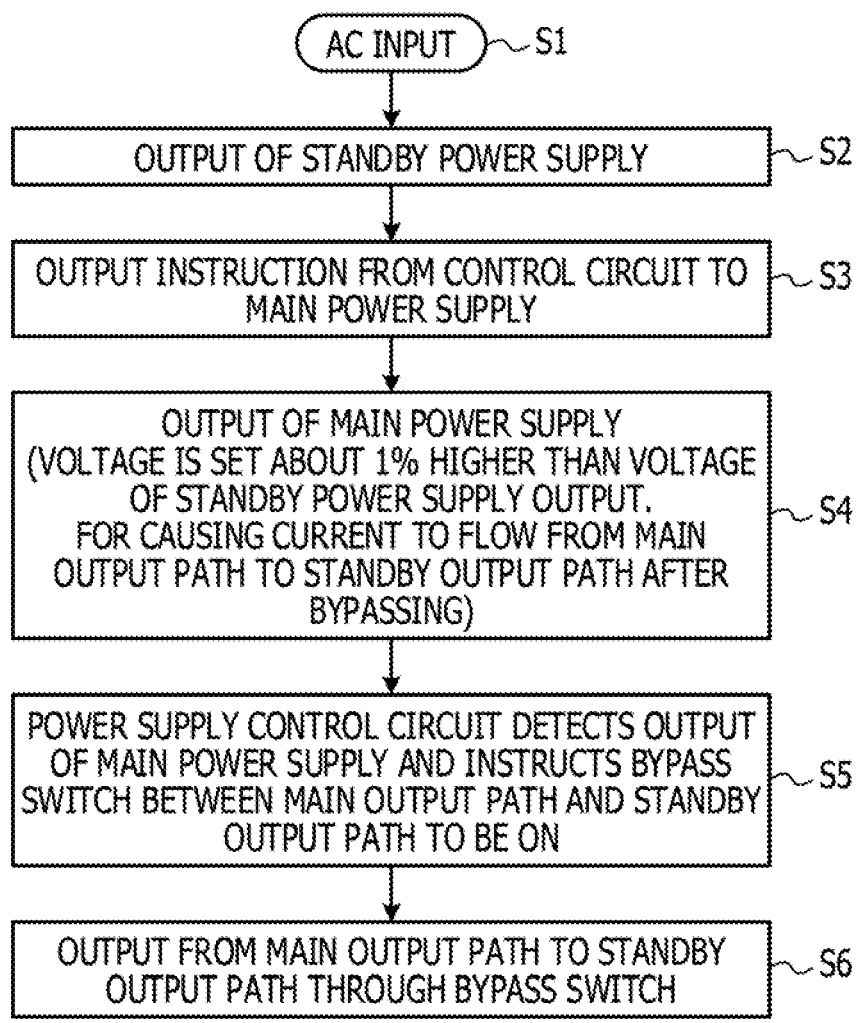
FIG. 5 is a flowchart of an example of an operation of an electronic device according to a first example.
Figure 6:
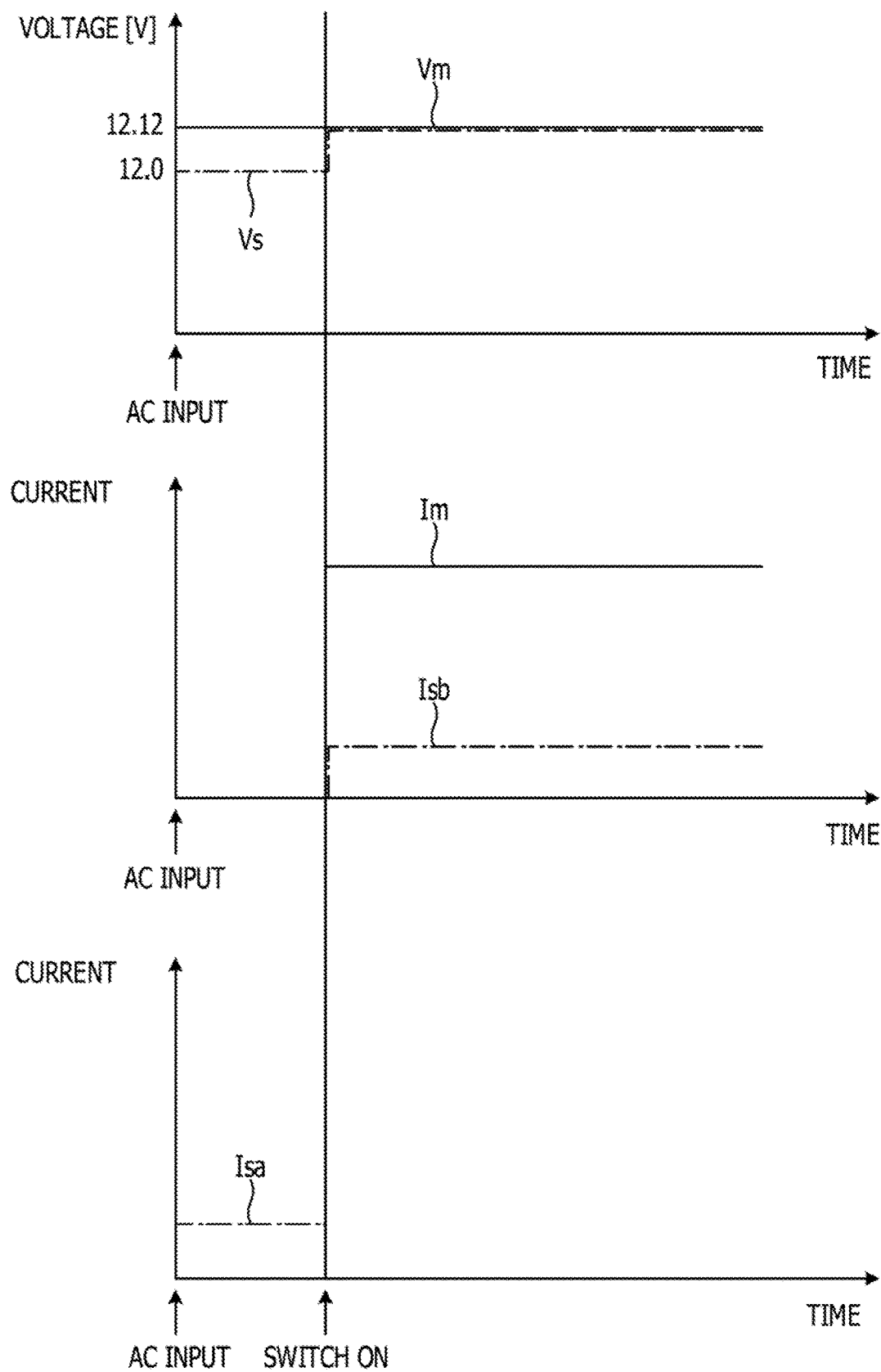
FIG. 6 is a timing chart of an example of an operation of a power supply circuit.

FIG. 5 is a flowchart of an example of an operation of the electronic device 201 according to the first example illustrating a flow at the time of activation of the PSU 101. FIG. 6 is a timing chart illustrating an example of an operation of the PSU 101 that is an example of the power supply circuit. FIG. 5 is described with reference to FIGS. 4 and 6. Fluctuation due to voltage drop and delay in the waveform of the diode 34 are ignored for convenience of description.

In step S1, when the AC power is input from the AC power to the PSU 101 by, for example, pressing a power switch of the electronic device 201, the standby power supply 11 is activated by the DC power supplied from the AC/DC conversion circuit 15. When the standby power supply 11 is activated, the output of the DC power from the standby power supply 11 to the first path 31 starts (step S2). The standby power supply 11 performs power conversion so that a voltage Vs of the first path 31 is 12.0 volts and outputs a DC output current Isa. In so doing, since the main power supply 12 is to be activated by the instruction signal 37 indicative of the output instruction from the system control circuit 21, the main power supply 12 at this stage is stopped without being activated (see the waveform in a top and bottom sections of FIG. 6).

The power supply control circuit 35 and the system control circuit 21 are activated by the power supplied to the first path 31. The system control circuit 21 outputs the instruction signal 37 indicative of the output instruction of the main power supply 12 (step S3). Upon reception of the instruction signal 37 indicative of the output instruction, the main power supply 12 starts the output to the second path 32 (step S4). The standby power supply 11 operates such that the voltage of the direct current power output to the first path 31 is the first set voltage (12.0 volts). The main power supply 12 operates such that the voltage of the direct current power output to the second path 32 is the second set voltage (12.12 volts) that is about 1% higher than the first set voltage. The main power supply 12 performs power conversion so that a voltage Vm of the second path 32 is 12.12 volts and outputs a DC output current Im (see the top and middle waveforms of FIG. 6).

In step S5, upon detection of the power output from the main power supply 12, the power supply control circuit 35 turns on the switch 33. When the switch 33 is turned on, the power output from the main power supply 12 to the second path 32 is supplied to the first path 31 through the switch 33 (step S6). In so doing, part of the output current Im of the main power supply 12 flows as a bypass current Isb that flows through the switch 33. Since the power the voltage of which is higher than that of the standby power supply 11 is supplied from the main power supply 12 to the first path 31 through the switch 33, the voltage Vs of the first path 31 is slightly increased so as to be equal to the voltage Vm of the second path 32. The output current Isa of the standby power supply 11 is stopped.

TABLE 1

|  | Main power supply (1588 W) | Standby power supply (36 W) | Entire PSU (1624 W) |
| --- | --- | --- | --- |
| Efficiency | 96% | 50% | 94%→96% |
| Loss | 66.2W→67.7 W (=66.2 W + 1.5 W) | 36 W→0 W | 102.2 W→67.7 W |

Table 1 illustrates an example of a measurement result of power conversion efficiency and loss of the PSU when using the main power supply 12 the rated voltage of which is 1588 W at an efficiency of 96% and the standby power supply 11 the rated power of which is 36 W at an efficiency of 50%. In the PSU without the switch 33, when the loss in the main power supply 12 alone is 66.2 W and the loss in the standby power supply 11 alone is 36 W, the efficiency is 94% and the loss is 102.2 W in the entire PSU. In contrast, in the PSU with the switch 33, although the loss is increased due to bypassing with the switch 33 by 1.5 W that is the loss of the switch 33, the efficiency is increased to 96% and the loss is reduced to 67.7 W in the entire PSU due to stopping of the output of the standby power supply 11.

Figure 7:
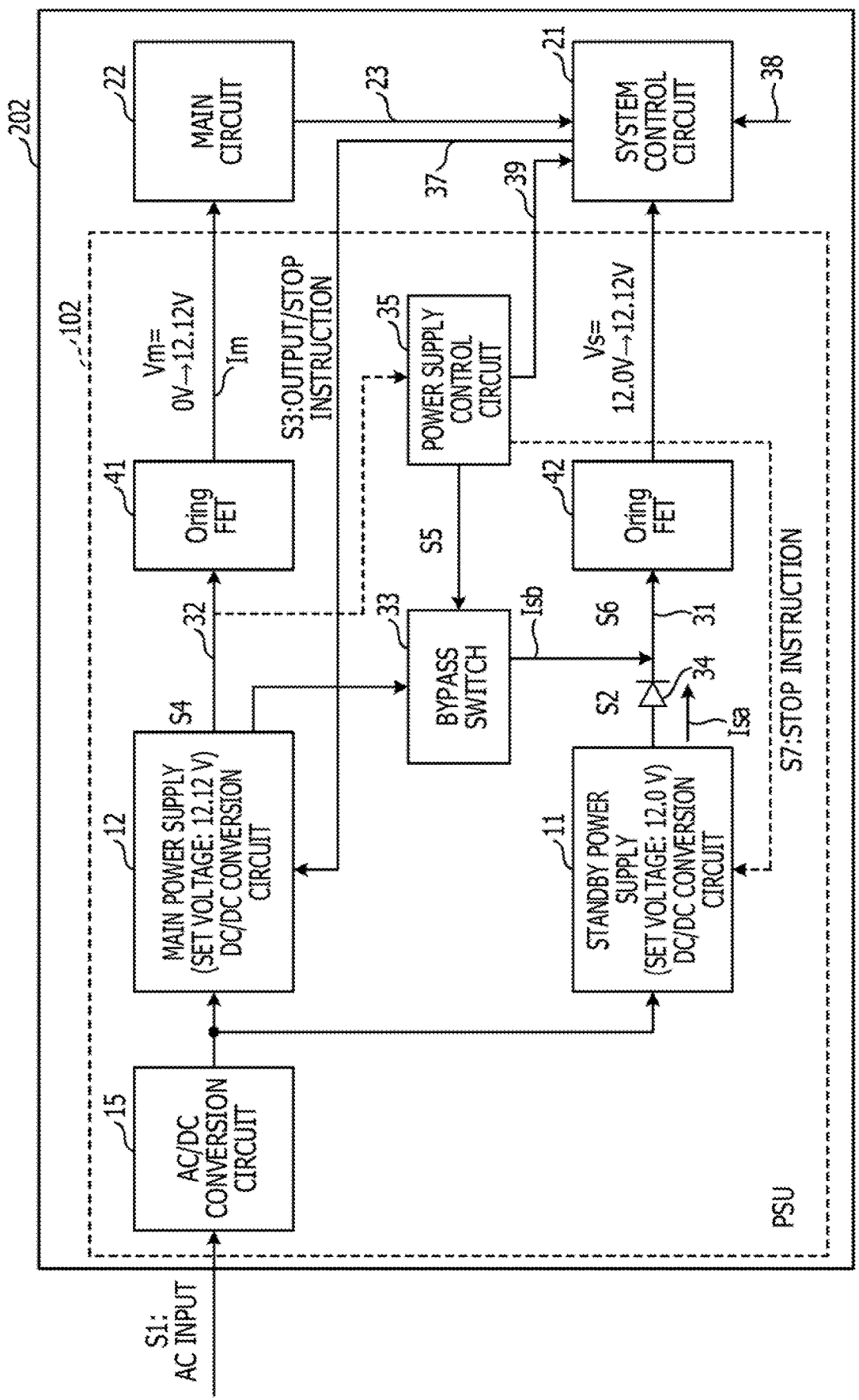
FIG. 7 illustrates an example of a configuration of an electronic device according to a second example.

FIG. 7 illustrates an example of a configuration of an electronic device according to a second example. In FIG. 7, an electronic device 202 is an example of the above-described electronic device 200. A PSU 102 is an example of the above-described power supply circuit 100. Description of configurations and effects similar to those of the electronic device and the PSU described above are omitted or simplified by incorporating the foregoing description.

The difference between the PSU 102 and the above-described PSU 101 is that the PSU 102 not only instructs the standby power supply 11 to stop the output but also instructs the standby power supply 11 to stop the operation. When the operation itself of the standby power supply 11 is stopped, the loss of the standby power supply 11 may be further reduced. When the switch 33 is turned on, the power supply control circuit 35 may output an instruction to stop the power conversion operation of the standby power supply 11 or may output an instruction to interrupt the power input to the standby power supply 11.

Figure 8:
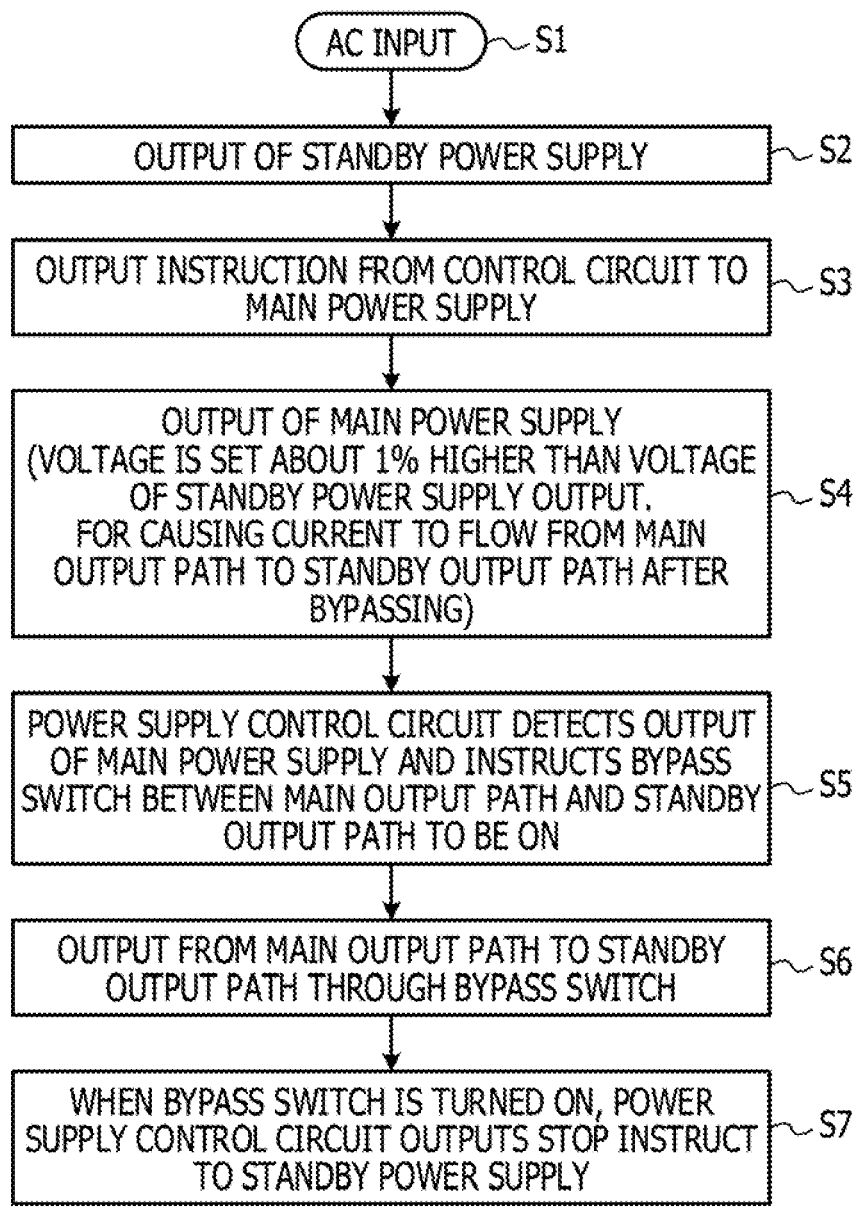
FIG. 8 is a flowchart of an example of an operation of an electronic device according to the second example.

FIG. 8 is a flowchart of an example of an operation of the electronic device 202 according to the second example illustrating a flow at the time of activation of the PSU 102. Since steps S1 to S6 are similar to those illustrated in FIG. 5, the description thereof is omitted.

In step S7, the power supply control circuit 35 outputs an instruction to stop the operation of the standby power supply 11 after the switch 33 has been turned on. Thus, the loss of the standby power supply 11 may be reduced in a non-standby state.

Figure 9:
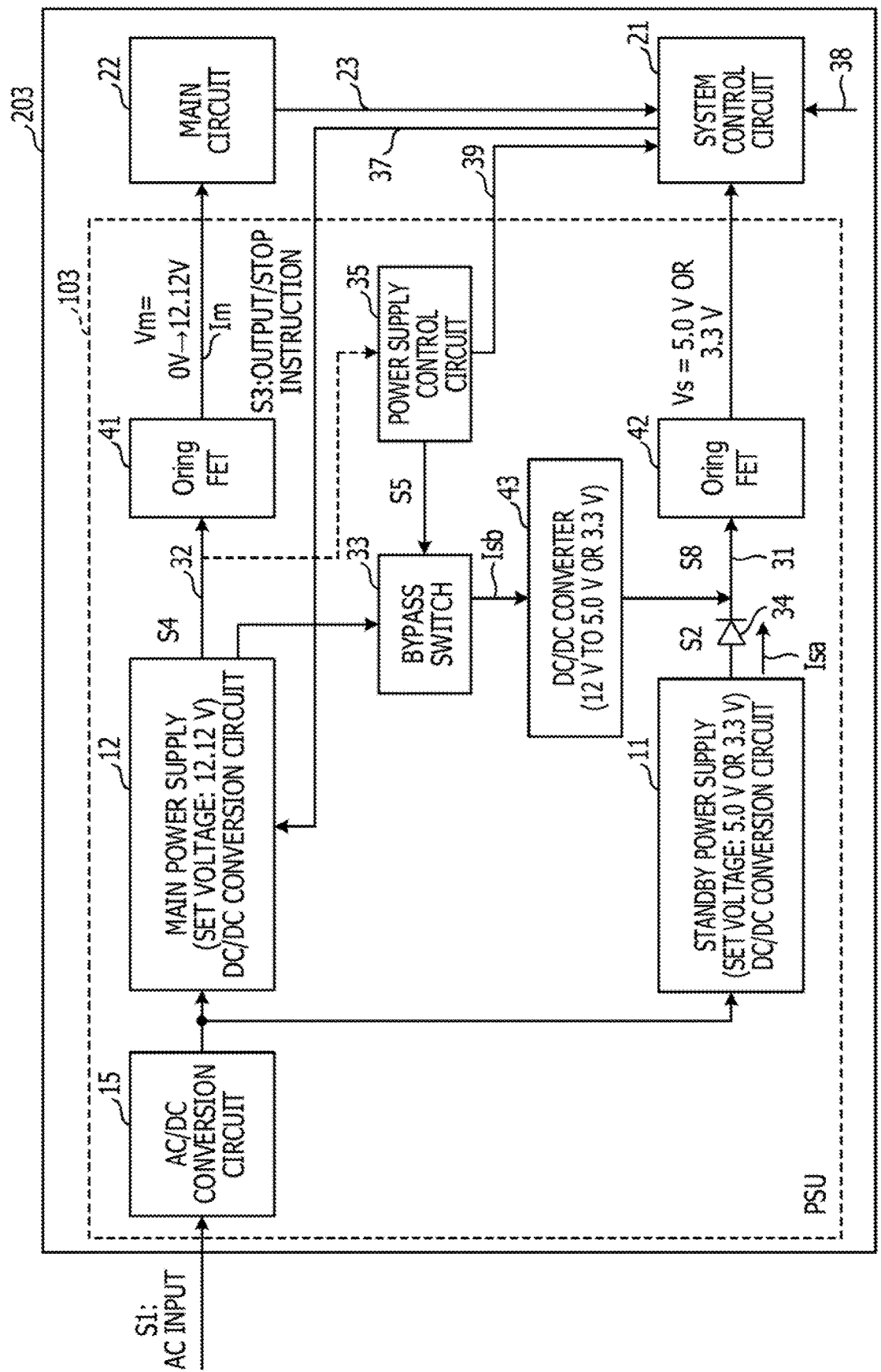
FIG. 9 illustrates an example of a configuration of an electronic device according to a third example.

FIG. 9 illustrates an example of a configuration of an electronic device according to a third example. In FIG. 9, an electronic device 203 is an example of the above-described electronic device 200. A PSU 103 is an example of the above-described power supply circuit 100. Description of configurations and effects similar to those of the electronic device and the PSU described above are omitted or simplified by incorporating the foregoing description.

The difference between the PSU 103 and the above-described PSU 101 is that the PSU 103 further includes a DC/DC converter 43. In the PSU 101, the standby power supply 11 and the main power supply 12 are of the same voltage system. In contrast, in the PSU 103, the standby power supply 11 and the main power supply 12 are of different voltage systems. For example, there is a case where the set voltage of the main power supply 12 is 12 volts and the set voltage of the standby power supply 11 is 5 volts or 3.3 volts. In such a case, it is preferable that the DC/DC converter 43 that reduces the voltage Vm of the second path 32 to a voltage slightly larger than 5 volts or 3.3 volts be inserted between the switch 33 and the first path 31.

FIG. 10 is a flowchart of an example of an operation of the electronic device according to the third example illustrating a flow at the time of activation of the PSU 103. Since steps S1 to S5 are similar to those illustrated in FIG. 5, the description thereof is omitted.

When the switch 33 is turned on in step S5, part of the power output from the main power supply 12 to the second path 32 is supplied to an input section of the DC/DC converter 43 through the switch 33 (step S8). The power input through the switch 33 is reduced by the DC/DC converter 43 and is output to the first path 31 (step S9). For example, the power the voltage of which is higher than the set voltage of the standby power supply 11 is output to the first path 31 by the DC/DC converter 43. As has been described, even when there is a difference in power supply voltage between the standby power supply 11 side and the main power supply 12 side, the loss due to stopping of the output of the standby power supply 11 is able to be reduced by insertion of the DC/DC converter 43.

Although the power supply circuit and the electronic device have been described according to the embodiment, the present disclosure is not limited to the above-described embodiment. Various alterations and modifications such as combination and replacement with part or whole of other embodiments may be made within the scope of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power supply circuit comprising:
   a standby power supply;
   a first path coupled to the standby power supply;
   a main power supply configured to output power a voltage of which is higher than a voltage of power output by the standby power supply;
   a second path coupled to the main power supply;
   a switch disposed between the first path and the second path; and
   a power supply control circuit configured to, upon detection of output of the power from the main power supply, turn on the switch to switch a power supply that supplies power to the first path from the standby power supply to the main power supply, wherein
   the power supply control circuit is operated by the power supplied through the first path.

2. The power supply circuit according to claim 1, wherein the power supply control circuit monitors a state of the power supply circuit while the power is supplied through the first path.

3. The power supply circuit according to claim 1, wherein, when an abnormality of the power supply circuit is detected while the power is supplied through the first path, the power supply control circuit turns off the switch.

4. The power supply circuit according to claim 1, wherein, when the abnormality of the power supply circuit is detected while the power is supplied through the first path, the power supply control circuit outputs an alarm signal to a control circuit operated by the power supplied through the first path.

5. The power supply circuit according to claim 1, wherein, when the abnormality of the power supply circuit is not detected while the power is supplied through the first path, the power supply control circuit turns on the switch.

6. The power supply circuit according to claim 1, wherein, when neither the abnormality of the power supply circuit nor the output of the main power supply is detected while the power is supplied through the first path, the power supply control circuit turns off the switch.

7. The power supply circuit according to claim 3, wherein the abnormality is an abnormality of the first path or an abnormality of the standby power supply.

8. The power supply circuit according to claim 3, wherein the abnormality is an abnormality of the second path or an abnormality of the main power supply.

9. The power supply circuit according to claim 3, wherein the abnormality is an abnormality of temperature.

10. The power supply circuit according to claim 1, wherein, when the output of the main power supply is not detected while the power is supplied through the first path, the power supply control circuit turns off the switch.

11. The power supply circuit according to claim 1, further comprising:
   a backflow blocking element inserted in series with the first path, wherein
   the backflow blocking element is configured to block a current that flows from the second path to the standby power supply through the switch.

12. An electronic device comprising:
   a standby power supply,
   a first path coupled to the standby power supply;
   a control circuit configured to be operated by power supplied through the first path;
   a main power supply configured to start outputting, based on an output instruction from the control circuit, to a second path power a voltage of which is higher than a voltage of power output by the standby power supply;
   a switch disposed between the first path and the second path; and
   a power supply control circuit configured to turn on the switch upon detecting the output of the main power supply to switch a power supply that supplies the power to the first path from the standby power supply to the main power supply, wherein
   the power supply control circuit is operated by the power supplied through the first path.

13. The power supply circuit according to claim 7, wherein the abnormality of the first path or the abnormality of the standby power supply is overvoltage or overcurrent.

14. The power supply circuit according to claim 8, wherein the abnormality of the second path or the abnormality of the main power supply is overvoltage or overcurrent.

\* \* \* \* \*